US009734549B2

(12) United States Patent
Aleksic et al.

(10) Patent No.: US 9,734,549 B2
(45) Date of Patent: *Aug. 15, 2017

(54) MEMORY DEVICE FOR PROVIDING DATA IN A GRAPHICS SYSTEM AND METHOD AND APPARATUS THEREOF

(71) Applicant: ATI Technologies ULC, Markham (CA)

(72) Inventors: Milivoje Aleksic, Richmond Hill (CA); Raymond M. Li, Markham (CA); Danny H. M. Cheng, Scarborough (CA); Carl K. Mizuyabu, Thornhill (CA); Anthony Asaro, Scarborough (CA)

(73) Assignee: ATI Technologies ULC, Markham, Ontario (CA)

( * ) Notice: Subject to any disclaimer, the term of this patent is extended or adjusted under 35 U.S.C. 154(b) by 217 days.

This patent is subject to a terminal disclaimer.

(21) Appl. No.: 14/556,801

(22) Filed: Dec. 1, 2014

(65) Prior Publication Data

US 2015/0154735 A1 Jun. 4, 2015

Related U.S. Application Data

(60) Division of application No. 12/429,833, filed on Apr. 24, 2009, now Pat. No. 8,924,617, which is a
(Continued)

(51) Int. Cl.
*G06F 13/14* (2006.01)
*G06T 1/60* (2006.01)
(Continued)

(52) U.S. Cl.
CPC ............ *G06T 1/60* (2013.01); *G06F 13/1663* (2013.01); *G06F 13/1684* (2013.01);
(Continued)

(58) Field of Classification Search
CPC .. G06F 12/0835; G06F 13/18; G06F 13/1663; G06F 13/1684; G06T 1/60; G09G 2360/125
(Continued)

(56) References Cited

U.S. PATENT DOCUMENTS 4,920,504 A 4/1990 Sawada et al.
5,371,874 A 12/1994 Chinnaswamy et al.
(Continued)

FOREIGN PATENT DOCUMENTS

EP 0829820 A2 3/1998
JP 10124438 A 5/1998
WO 9706523 2/1997

OTHER PUBLICATIONS

European Search Report for Patent Application EP00304528; May 3, 2002.
(Continued)

*Primary Examiner* — Tammara Peyton
(74) *Attorney, Agent, or Firm* — Faegre Baker Daniels LLP

(57) ABSTRACT

A central processor unit (CPU) is connected to a system/graphics controller generally comprising a monolithic semiconductor device. The system/graphics controller is connected to an input output (IO) controller via a high-speed PCI bus. The IO controller interfaces to the system graphics controller via the high-speed PCI bus. The IO controller includes a lower speed PCI port controlled by an arbiter within the IO controller. Generally, the low speed PCI arbiter of the IO controller will interface to standard 33 MHz PCI cards. In addition, the IO controller interfaces to an external storage device, such as a hard drive, via either a standard or a proprietary bus protocol. A unified system/graphics memory which is accessed by the system/graphics controller. The unified memory contains both system data and
(Continued)

graphics data. In a specific embodiment, two channels, CH0 and CH1 access the unified memory. Each channel is capable of accessing a portion of memory containing graphics data or a portion of memory containing system data.

13 Claims, 9 Drawing Sheets

Related U.S. Application Data continuation of application No. 10/075,149, filed on Feb. 14, 2002, now Pat. No. 7,543,101, which is a division of application No. 09/347,202, filed on Jul. 2, 1999, now Pat. No. 6,469,703.

(51) Int. Cl.
G09G 5/39 (2006.01)
G06F 13/16 (2006.01)
G06F 13/28 (2006.01)
G06T 1/20 (2006.01)
G09G 5/393 (2006.01)

(52) U.S. Cl.
CPC .............. *G06F 13/28* (2013.01); *G06T 1/20* (2013.01); *G09G 5/39* (2013.01); *G09G 5/393* (2013.01); *G09G 2360/125* (2013.01)

(58) Field of Classification Search
USPC ........................................... 711/151
See application file for complete search history.

(56) References Cited

U.S. PATENT DOCUMENTS

| | | | |
|---|---|---|---|
| 5,384,737 A | 1/1995 | Childs et al. |
| 5,392,407 A | 2/1995 | Heil et al. |
| 5,600,605 A | 2/1997 | Schaefer |
| 5,602,986 A | 2/1997 | Trevett |
| 5,657,469 A | 8/1997 | Shimizu |
| 5,659,715 A | 8/1997 | Wu et al. |
| 5,727,171 A | 3/1998 | Iachetta, Jr. |
| 5,752,269 A | 5/1998 | Divivier et al. |
| 5,761,727 A | 6/1998 | Wu et al. |
| 5,767,865 A | 6/1998 | Inoue et al. |
| 5,815,167 A | 9/1998 | Muthal et al. |
| 5,818,464 A | 10/1998 | Wade |
| 5,822,772 A | 10/1998 | Chan et al. |
| 5,850,483 A | 12/1998 | Takabatake et al. |
| 5,852,451 A | 12/1998 | Cox et al. |
| 5,854,637 A | 12/1998 | Sturges |
| 5,854,638 A | 12/1998 | Tung |
| 5,920,352 A | 7/1999 | Inoue |
| 5,987,557 A | 11/1999 | Ebrahim |
| 5,987,574 A | 11/1999 | Paluch |
| 5,996,036 A | 11/1999 | Kelly |
| 5,996,051 A | 11/1999 | Mergard |
| 6,002,412 A | 12/1999 | Schinnerer |
| 6,041,417 A | 3/2000 | Hammond et al. |
| 6,052,134 A | 4/2000 | Foster |
| 6,052,756 A | 4/2000 | Barnaby et al. |
| 6,076,139 A | 6/2000 | Welker et al. |
| 6,078,338 A | 6/2000 | Horan et al. |
| 6,092,158 A | 7/2000 | Harriman et al. |
| 6,104,416 A | 8/2000 | McGuinness |
| 6,118,462 A | 9/2000 | Margulis |
| 6,134,621 A | 10/2000 | Kelley et al. |
| 6,151,651 A | 11/2000 | Hewitt et al. |
| 6,172,933 B1 | 1/2001 | Sager |
| 6,173,367 B1 | 1/2001 | Aleksic et al. |
| 6,175,888 B1 | 1/2001 | Guthrie et al. |
| 6,175,889 B1 | 1/2001 | Olarig |
| 6,199,145 B1 | 3/2001 | Ajanovic et al. |
| 6,212,611 B1 | 4/2001 | Nizar et al. |
| 6,230,223 B1 | 5/2001 | Olarig |
| 6,252,612 B1 | 6/2001 | Jeddeloh |
| 6,253,276 B1 | 6/2001 | Jeddeloh |
| 6,260,123 B1 | 7/2001 | Strongin et al. |
| 6,269,433 B1 | 7/2001 | Jones et al. |
| 6,279,065 B1 | 8/2001 | Chin et al. |
| 6,295,068 B1 | 9/2001 | Peddada et al. |
| 6,295,568 B1 | 9/2001 | Kelley et al. |
| 6,308,237 B1 | 10/2001 | Strongin et al. |
| 6,317,803 B1 | 11/2001 | Rasmussen et al. |
| 6,326,973 B1 | 12/2001 | Behrbaum et al. |
| 6,327,636 B1 | 12/2001 | Guthrie et al. |
| 6,330,646 B1 | 12/2001 | Clohset et al. |
| 6,330,654 B1 | 12/2001 | LaBerge et al. |
| 6,381,672 B1 | 4/2002 | Strongin et al. |
| 6,412,048 B1 | 6/2002 | Chauvel et al. |
| 6,430,660 B1 | 8/2002 | Kemp et al. |
| 6,469,703 B1 | 10/2002 | Aleksic et al. |
| 6,480,917 B1 | 11/2002 | Moertl et al. |
| 6,486,884 B1 | 11/2002 | Aleksic et al. |
| 6,504,549 B1 | 1/2003 | Holister et al. |
| 6,542,159 B1 | 4/2003 | Mizuyabu et al. |
| 6,546,449 B1 | 4/2003 | Aleksic et al. |
| 6,643,746 B1 * | 11/2003 | Bouquet ................ G06F 13/18 711/151 |
| 6,681,285 B1 | 1/2004 | Ng |
| 6,874,042 B2 | 3/2005 | Sauber |
| 7,397,477 B2 | 7/2008 | Radke |
| 7,543,101 B2 | 6/2009 | Aleksic et al. |
| 8,924,617 B2 | 12/2014 | Aleksic et al. |
| 2008/0168250 A1 | 7/2008 | Choi et al. |

OTHER PUBLICATIONS

Mitsuyama, Yukio et al.; VLSO Implementation of High Performance Burst Mode for 128-Bit Block Ciphers; IEEE; 2001.
Definition of Direct Memory Access; from Wikipedia; Sep. 4, 2008.
Definition of Shared Memory Architecture; from Wikipedia; May 2, 2009.
Definition of Uniform Memory Access; from Wikipedia; May 24, 2009.
A Guide to the "New" AMD Socket A Athlon Processor; from www.duxcw.com; Jun. 11, 2000.
Bogdanov, A.; Unified Memory Space Protocol Specification; Dec. 2000.
How Motherboards Work; from Howstuffworks.com; Jan. 12, 2007.
Definition of Northbridge (computing); from Wikipedia; Jan. 16, 2007.
Definition of Southbridge (computing); from Wikipedia; Jan. 12, 2007.
Definition of RDRAM; from Wikipedia; Jan. 12, 2007.
Intel 810 Chipset Review; X-Bit Labs; May 25, 1999.

* cited by examiner

MEMORY DEVICE FOR PROVIDING DATA IN A GRAPHICS SYSTEM AND METHOD AND APPARATUS THEREOF

CROSS REFERENCE TO RELATED APPLICATIONS

This application is a divisional application of U.S. patent application Ser. No. 12/429,833, filed Apr. 24, 2009 which is a Continuation of U.S. patent application Ser. No. 10/075, 149, filed Feb. 14, 2002 (now U.S. Pat. No. 7,543,101, issued on Jun. 2, 2009), entitled "System Of Accessing Data In A Graphics System and Method Thereof," which is incorporated in its entirety herein and priority is hereby claimed under 35 U.S.C. §120. The instant Continuation application is commonly owned by the assignee along with the parent U.S. patent application Ser. No. 10/075,149.

U.S. patent application Ser. No. 10/075,149 is a divisional application of U.S. patent application Ser. No. 09/347,202, filed Jul. 2, 1999 (now U.S. Pat. No. 6,469,703, issued on Oct. 22, 2002, entitled "Accessing Data in a Graphics System and Method Thereof," having inventors Aleksic et al., and owned by instant assignee.

A Application, issued as U.S. Pat. No. 6,546,449 on Apr. 8, 2003, titled "Graphics Controller for Accessing Data in a System and Method Thereof," and owned by instant assignee of the present application.

A Application, issued as U.S. Pat. No. 6,542,159 on Apr. 1, 2003 titled "Apparatus To Control Memory Accesses In A Video System And Method Thereof", and owned by instant assignee of the present application.

A Application, issued as U.S. Pat. No. 6,504,549 on Jan. 7, 2003 titled "Apparatus To Arbitrate Among Clients Requesting Memory Access In A Video System And Method Thereof," and owned by instant assignee of the present application.

A Application, issued as U.S. Pat. No. 6,486,884 on Nov. 26, 2002 titled "Apparatus For Accessing Memory In A Video System And Method Thereof," and owned by instant assignee of the present application.

FIELD OF THE INVENTION

The present invention generally relates to system having a combined system, memory, and graphic controller, and more specifically to a system and graphic controller using a unified memory.

BACKGROUND OF THE INVENTION

Prior art computer systems have traditionally used separate system and graphics memory controllers. One reason for using separate system and graphic controllers has been the need to use dedicated graphics memory, which was controlled by the graphic controller. The use of dedicated graphics memory has been needed in order to access and process graphics data fast enough to assure the frame refresh rate of the computer system is maintained. When a video graphics engine can not maintain a frame rate, the picture can look choppy and will generally be unsuitable for viewing by a user.

With three-dimensional graphics, multiple data types are stored for each pixel. In order to render the final image on a display device, it is necessary of a graphics engine to retrieve all types of data associated with each pixel. Often, this involves opening and closing multiple blocks of memory, requiring overhead delay in the process.

Prior art graphic systems have also used Accelerated Graphics Port (AGP) protocol in order to access translation table information to map graphics data requests from virtual memory space to logical memory space. The implementation of the AGP requires the entire protocol associated with the AGP port to be completely implemented not only on the memory controller, but on the external device also being accessed via the AGP port as well. As a result, the amount of overhead needed to satisfy the AGP protocol requirements increases the cost of the system.

Yet another problem associated with prior art systems was that the system bus was used to access memory and hard drive devices resulting in bandwidth limitation of the system bus. For example, a Peripheral Components Interconnect (PCI) bus would often be used in order to access system memory and peripherals, as well as other mass storage devices. When the PCI bus was used to transmit data from a number of data storage sources, the arbiter associated with the external storage devices became bandwidth limited due to the transmission capabilities of the protocol implemented on the system bus.

Therefore, a system capable of overcoming these problems would be advantageous.

DETAILED DESCRIPTION OF THE PREFERRED EMBODIMENT

In one embodiment of the present invention, a central processor unit (CPU) is connected to a system/graphic controller generally comprising a monolithic semiconductor device. The system/graphic controller is connected to an input output (IO) controller via a high-speed PCI bus. The IO controller interfaces to the system graphic controller via the high-speed PCI bus. The IO controller includes a lower speed PCI (Peripheral Components Interconnect) port controlled by an arbiter within the IO controller. Generally, the low speed PCI arbiter of the IO controller will interface to standard 33 megahertz PCI cards. In addition, the IO controller interfaces to an external storage device, such as a hard drive, via either a standard or a proprietary bus protocol. By servicing the hard drive on a bus other than the System PCI bus, and servicing the IO controller via a high speed PCI bus, it is possible to access data from the hard drive without limiting the bandwidth on the low speed PCI bus interface. The high-speed PCI interface allows for high-speed data storage accesses either from the hard drive, or the external PCI devices.

In addition, the present invention includes a unified system/graphics memory, which is accessed by the system/graphic controller. The unified memory contains both system data and graphics data. In a specific embodiment, two channels, CH0 and CH1 access the unified memory. Each channel is capable of accessing a portion of memory containing graphics data or a portion of memory containing system data. Therefore, it is possible of each channel to access graphics data simultaneously, system data simultaneously, or graphic and system data simultaneously. For example, at any given access time, both channels can be accessing system memory, graphics memory, or one of each types of memory. Simultaneous accesses are facilitated by assuring the physical addresses are partitioned into blocks within the unified memory, such blocks of data are adjacent blocks are accessed by different channels.

Figure 1:
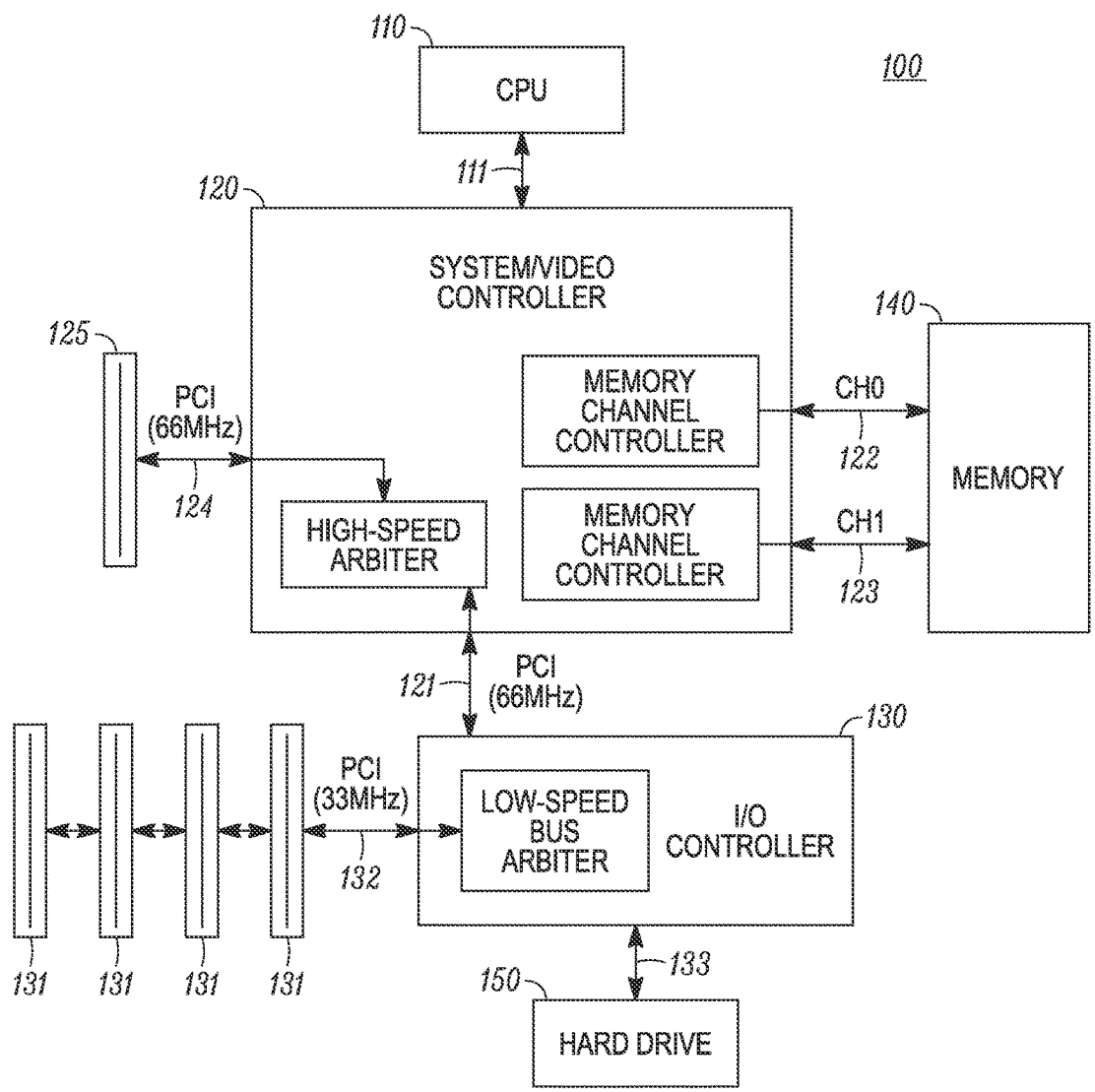
FIG. 1 illustrates, in block diagram form, a system configuration in accordance with the present invention.

FIG. 1 illustrates a specific implementation of a portion of system 100 of the present invention. In general, the system 100 is associated with a computer such as a personal computer or other individual workstation type product. The system 100 includes a central processing unit (CPU) 110, a system/graphic controller 120, a memory 140, IO controller 130, hard drive 150, a high speed PCI slot 125, and low speed PCI slots 131.

The CPU 110 is bi-directionally connected to the system/graphic controller 120 by the bus 111. The system/graphic controller 120 is bi-directionally connected to a high-speed PCI port 125 by bus 121. The system/graphic controller 120 is further bi-directionally connected to the memory 140 by a first memory channel (CH0) 122 and a second memory channel (CH1) 123. The IO controller 130 is bi-directionally connected to the system/graphic controller 120 by the bus 121. Hard drive 150 is bi-directionally connected to the IO controller 130. The low speed PCI ports 131 are connected to the IO controller 130 by the bus 132.

In operation, the system/graphic controller 120 interfaces to the CPU 110, performs graphics operations, controls the memory channels CH0 and CH1, performs address translations on graphic addresses, and provides control to the high speed PCI bus 121. The specific portions of the system/graphic controller will be discussed in more detail with reference to subsequent Figures.

The system/graphic controller 120 receives data access requests from the CPU 110, as well as requests from its own internal clients, such as its graphic engine. A unified memory 140 is used in order to accommodate both the system and graphic requests. Based upon the actual configuration of the memory components comprising the memory 140, the control of memory 140 will be split between CH0 and CH1. Each channel will generally have a portion of its memory space associated with graphics data, and a portion of its memory space associated with the system data.

Since each bank of memory 140 is accessed by a separate channel of memory, it is possible to simultaneously access both system data and graphics data, or simultaneously or access of graphics data on two channels as needed. Each channel, CH0 and CH1, of FIG. 1 includes an address bus portion, control bus portion, and a data bus portion. In other implementations, multiple read and write buses can be associated with each of the individual channels. The present invention is not intended to be limited to any specific implementation of the channels' busses.

In addition to accessing memory for the system and graphic portions of the system 100, the system/graphic controller 120 has a high-speed arbiter to interface to the IO controller 130 and the external PCI port 125. The high-speed arbiter services an external peripheral at port 125, as the IO controller 130 connected to bus 121. The busses connected to port 125 and IO controller 130 can be separate busses, or a common bus, such as a PCI bus.

The IO controller 130 has a PCI bus arbiter for controlling the lower speed PCI ports 131 connected to PCI bus 132. In addition, IO controller 130 has a bus 133 connected to the hard drive 150. The bus 133 connecting hard drive 150 to the IO controller is not necessarily a PCI bus. Data retrieved from the hard drive 150, as well as the ports 131, is provided to the system/graphic controller, as needed, via the high-speed bus 121. By keeping the hard drive 150 on a bus separate from the low speed PCI bus 132, bandwidth problems are avoided and system performance is improved. One of ordinary skill in the art will recognize that other protocols besides the PCI protocol can be used. In one embodiment, a PCI bus having a speed of 66 MHz can be used for busses 121 and 124. However, any bus rate at bus 121 that is at least 10 percent faster that the bus rate of the bus 132 is desirable in order to achieve improved data flow capabilities desirable in accordance with the present invention.

Yet another advantage of the specific implementation of FIG. 1 is that that system/graphic controller 120 can support asynchronous access of the memory 140 from the CPU 110. In other words, the CPU 110 can access data from the system/graphic controller 120 at a rate different than the system/graphic controller 120 accesses data from the memory 140. For example, data can be transmitted between the system/graphic controller 120 and the CPU 110 at 133 megahertz. However, the system/graphic controller 120 can access the data from the memory 140 on channels CH0 and CH1 at a rate of 100 megahertz. The specific implementation allowing for asynchronous accesses will generally require buffering by the system/graphic controller. By allowing such asynchronous transfers, it is possible to optimize systems for price and/or performance based upon individual user or application needs.

Figure 2A:
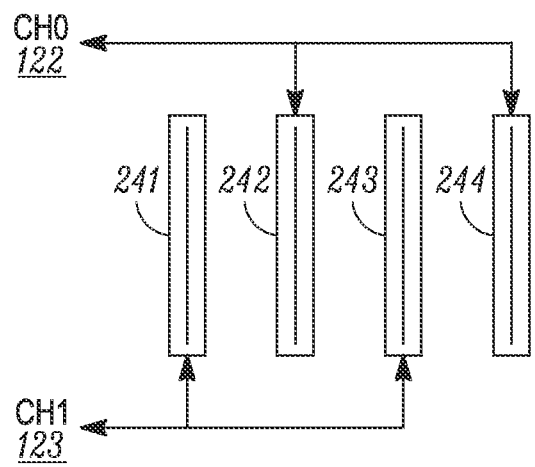
FIGS. 2A and 2B illustrate, in block diagram form, a memory portion of the system of FIG. 1.

FIG. 2A illustrates a specific implementation of accessing memory components from channels CH0 and CH1. FIG. 2A illustrates memory slots 241, 242, 243, and 244. In general, the memory slots 241 through 244 will be populated using single inline memory modules, dual inline memory modules, or any other type of standard or proprietary memories. Based upon specific implementations, a portion of the memory slots 241-244 can represent fixed memory on a motherboard of a computer system, while other slots of 241-244 can reside as add-in slots. The present invention is not limited to 4 memory slots or components, as more or less components are anticipated herein.

As illustrated in FIG. 2A, the memory slots 241 and 243, and hence the memory residing therein, is accessed by the channel CH0 via bus 122. Memory slots 242 and 244 are accessed via channel CH1 on bus 123. As will be discussed in greater detail with reference to FIG. 3, it is generally advantageous to provide enough memory components to assure each channel of has access to memory. For example, it would not generally be advantageous to provide memory components to only CH1 slots 241 and 243.

Figure 2B:
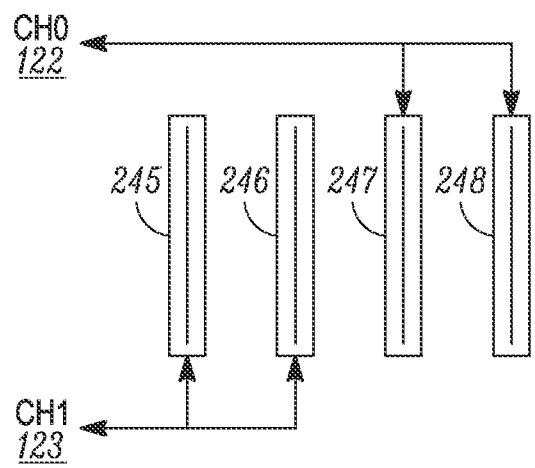

FIG. 2B illustrates another specific implementation of accessing memory slots from channels CH0 and CH1. FIG. 2B illustrates memory components 245, 246, 247, and 248. In general, the memory slots 245 through 246 will contain single inline memory modules, dual inline memory modules, or any other type of standard or proprietary memories. Based upon specific implementations, a portion of the memory slots 245-248 can be fixed on motherboard of a computer system and populated, while the other slots of 245-248 can reside as add-in slots. The present invention is not limited to 4 memory slots, as more or less slots are anticipated herein.

As illustrated in FIG. 1, the memory components 247 and 248 are accessed by the channel CH0 via bus 122. Memory components 245 and 246 are accessed via channel CH1 on bus 123.

Figure 3:
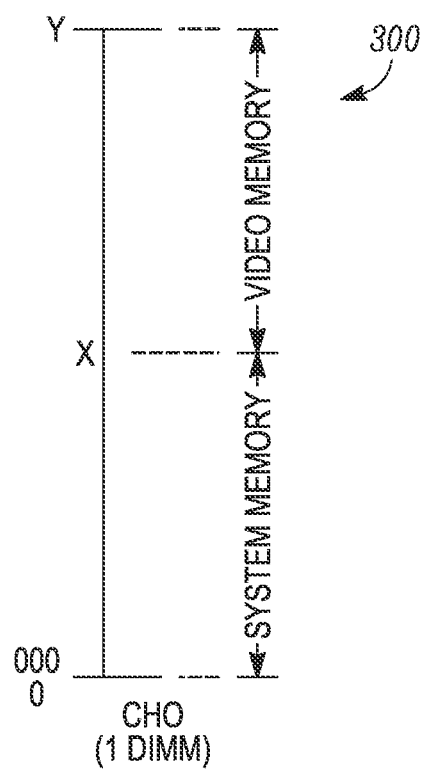
FIGS. 3, 4A, 4B, and 4C illustrate specific embodiments of memory implementations of the system of FIG. 1.

FIGS. 3, 4A, 4B, and 4C show specific memory configurations for the system of FIG. 1. FIG. 3 illustrates an implementation whereby the unified memory 140 has only one memory connected to channel CH0. In this embodiment, only channel CH0 has access to memory space. In order to accommodate a unified memory, a portion of the address space from 0000h (where "h" designates a hexadecimal number) through address Xh is illustrated as being dedicated to storing system data. The address space from system Xh+1 through the top of the address space Yh is indicated to be dedicated to storing graphics memory. The memory space 300 associated with channel CH0 is used to access both the system memory and the graphics memory.

Figure 4C:
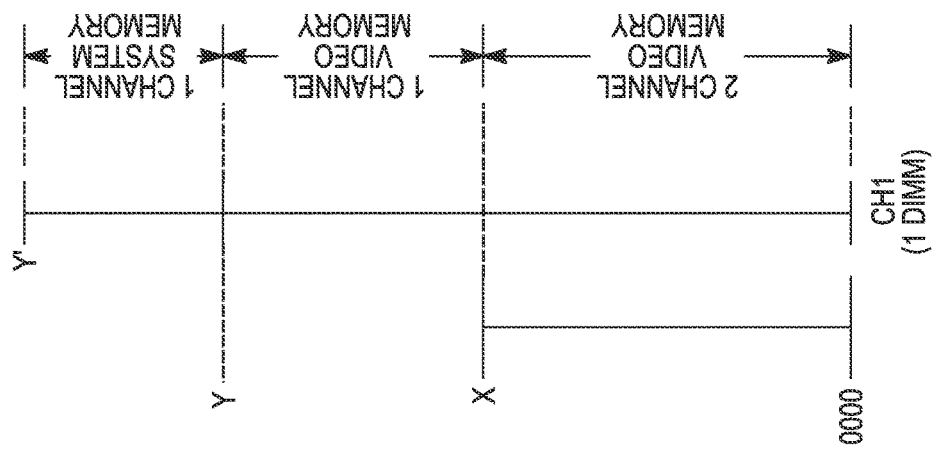
Figure 4B:
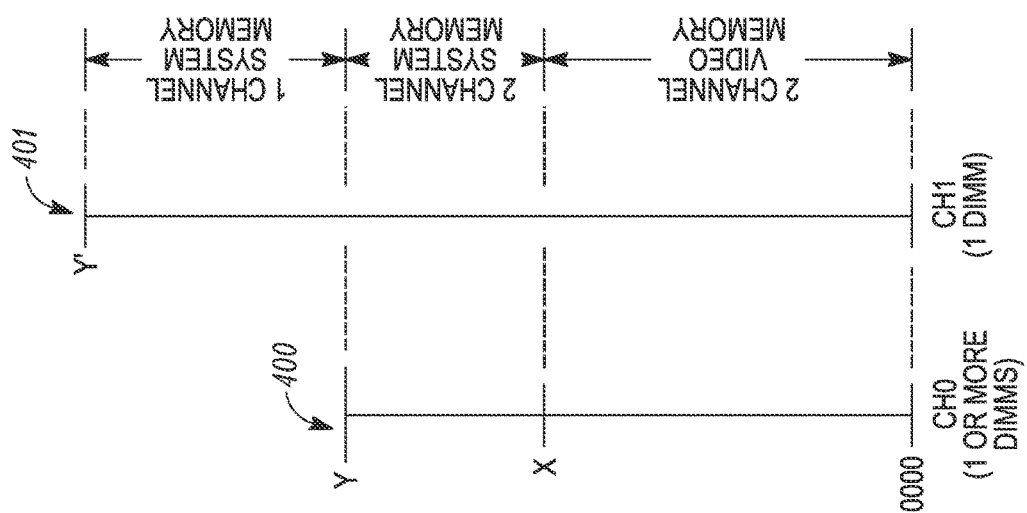
Figure 4A:
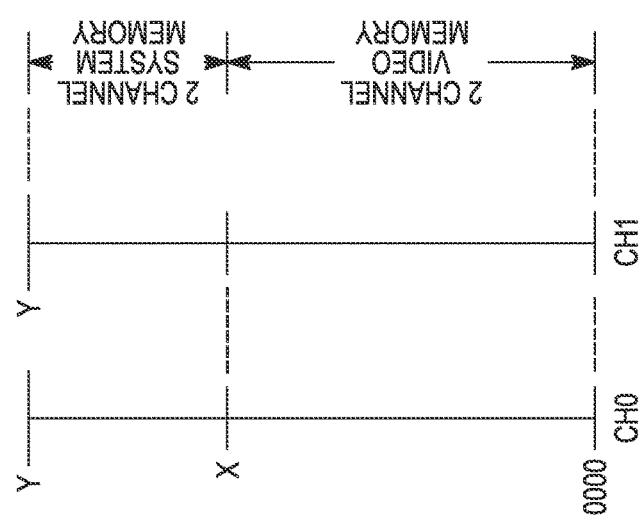

FIGS. 4A, 4B, and 4C illustrate alternate memory configurations where memory is available to both channel CH0 and CH1. In these configurations, channel CH0 is illustrated to include one or more memory components. In FIG. 4A, each channel has a physical address space from 0000h to Yh at the top of memory. The memory is partitioned at the address value X, such that two channels of memory are available as graphics memory from 0000h to Xh and two channels of system memory are available from X+1h to Yh.

FIG. 4B illustrates CH 0 having one or more memory components and having an address space from 0000h to Yh. In a similar manner, the memory associated channel CH1 includes one or more memory components having a physical address space from 0000h to Y'. For illustration purposes, the address space 401 of channel CH1 is illustrated to be greater than the address space 400 of channel CH0.

When two channels of data are available, it is advantageous according to the present invention to provide address space in both channel CH0 and CH1 to graphics data and to system data. For example, FIGS. 4A and 4B illustrate address space from 0000h through an Xh in both channels as dedicated to the graphics memory. This provides 2Xh of physical memory for storing the graphics data. In the implementation illustrated in FIGS. 4A and 4B, the address space of channel CH0 from Xh+1 to the top of the CH0 memory, Yh, is dedicated to the system memory. Likewise, the address space from address Xh+1 of channel CH1 to physical address Yh is dedicated to the system memory. As a result there are two channels of system memory available to store system data—from physical address locations Xh+1 through Yh of channels CH1 CH0. However, channel CH1 has additional memory from location Yh+1 through the top of channel CH1 memory, Y'h. Therefore, the system data is can be stored in memory space associated with either single channel or dual channels. In other embodiments, the smaller memory, the memory of CH0, can reside at the upper address space beginning at Y'h.

FIG. 4C illustrates another embodiment for partitioning memory. Generally, the memory of FIG. 4C illustrates similar banks of memory as that of FIG. 4B, in that CH1 has a larger memory space CH0. The embodiment illustrated in FIG. 4C dedicates all of the two channel memory space (000h to Xh) to graphics memory, a portion of the single channel CH1 memory to graphics memory (x+1h to Yh), and only a portion of the single channel CH1 memory to system memory (Y+1h to Y').

In accordance with the embodiment illustrated, it is advantageous to assure that the graphics memory is associated with two channels of memory when available. The advantage of having two channels of memory is due to the nature of graphics data. For an implementation where the graphics data is store as a large word size, such as 128 bits, proper configuration of the two channels allows for two simultaneous accesses of 64 bits to provide the 128-bit word. This allows for the graphics data to be provided to the graphic engine in data words of 128 bits of data, thereby allowing the video graphics engine to receive data at an optimal.

Figure 5:
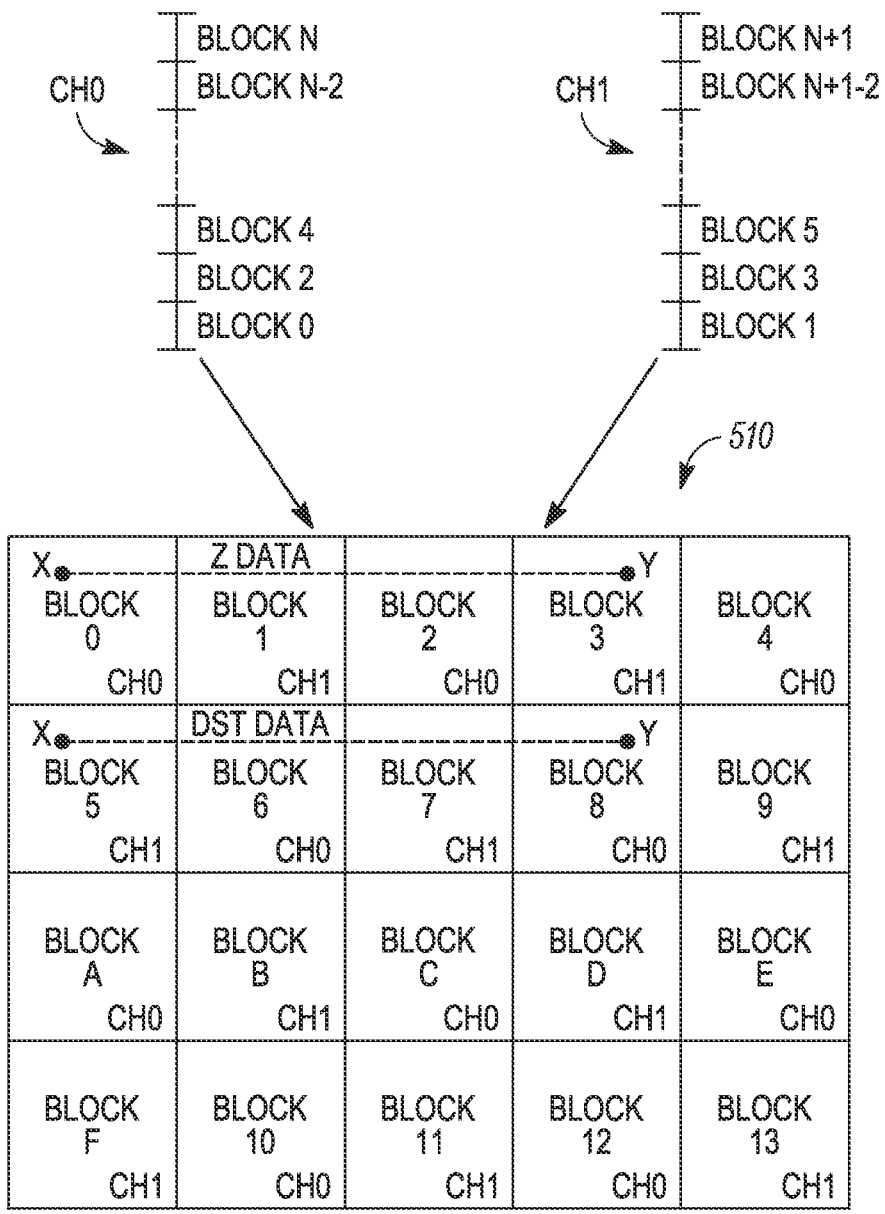
FIG. 5 illustrates specific implementation of the memory system associated with FIG. 1.

The configuration of the memory space 400 and 401, of FIG. 4B, is further discussed with reference to FIG. 5. FIG. 5 illustrates the memory locations of channels CH0 and CH1 partitioned into blocks, which are logically addressed by channels CH0 and CH1. In the embodiment shown, the blocks are accessed by CH0 and CH1 in an alternating manner. For example, block 0, as illustrated in table 5 of FIG. 5, is accessed by channel CH0; block 1, which is horizontally adjacent to block 0, is accessed by channel CH1; the next horizontally adjacent block, block 2, is accessed by channel CH0. In this alternating manner, different data channels access horizontally adjacent data blocks associated with the first row of memory (row 0). In the specific embodiment of FIG. 5, the horizontally adjacent channels have adjacent physical addresses, in that the last memory location of block 0 is immediately adjacent to the first memory location of block 1.

The next row (row 1) of memory blocks is also accessed by channels CH0 and CH1 in an alternating manner, except that the first block of row 1, block 5, is accessed by a different channel than the first block of row 0, which is vertically adjacent to block 5. Specifically, channel CH1 accesses block 5. By alternating accesses of vertically and horizontally adjacent blocks between CH0 and CH1, an access requiring multiple adjacent blocks in a row or in a column will result in the adjacent blocks being accessed by different channels. This allows for greater efficiency in accessing data, in that for a single channel to access adjacent blocks requires the memory controller to close a block, and open a new block, requiring overhead of four access cycles. By assigning alternating blocks between channels, it is possible for the overhead of opening and closing blocks to be overlapped thereby reducing the effective overhead. Note that vertically adjacent blocks, as well as horizontally adjacent blocks are logically consecutive blocks of data, in that it is possibly for an image to cross between such logically consecutive blocks.

Furthermore, FIG. 5 illustrates a frame of Z-data graphics stored in blocks 0-3, and a frame of block of destination (DST) graphics data stored in blocks 5-8. In accordance with a specific embodiment of the present invention, Z and DST graphics data are different types of data associated with a common three-dimensional graphic. Each pixel of a three-dimensional image will have associated Z-data and DST-data. DST-data represents the actual image to be drawn. Z-data represents the depth of specific portions of the image related to the DST-data. Generally, each pixel of a three-dimensional image will have a Z-data and a DST-data. In addition, other types of data can be associated with three-dimensional images.

In the embodiment illustrated, the memory controller has stored the first byte of Z data at block address X of BLOCK 0, where X represents a memory location relative to BLOCK 0. Likewise, the memory controller has stored the first byte of DST data at block address X of BLOCK 1, where X represents a memory location relative to BLOCK 5. BLOCKs 0 and 5 have been specifically chosen because they are accessed by opposite channels. Storing in opposite channels is useful, because the first byte of Z-data and DST data correspond to a common pixel. Therefore, it is possible to simultaneously access the Z and DST data for common pixels by storing different data types in different channels. In a specific embodiment, the Z and DST data are stored beginning in the same respective location of each block in order to assure common pixel data is stored in different channels for all Z and DST data.

If the first byte of the DST data were stored within BLOCK 4, it would not be possible to access the data simultaneously with the first byte of the Z data stored in block 0 because both blocks 0 and 4 are accessed by channel 0. As a result, BLOCK 0 would have to be closed, at a cost of 2 cycles, and BLOCK 4 opened at a cost of 2 cycles, before accessing the Z and DST data for a common pixel.

Figure 6:
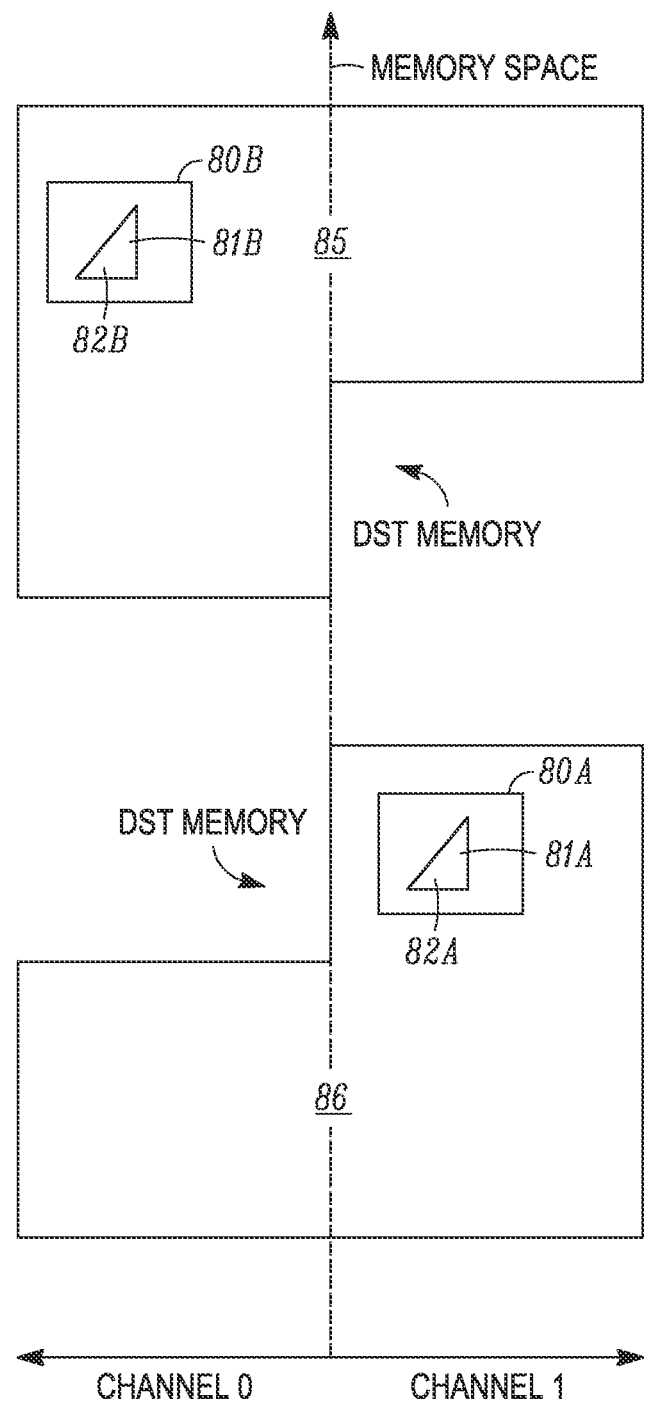
FIG. 6 illustrates a block view of one of the memory system implementations of FIG. 5.

FIG. 6 illustrates channels 0 and 1 storing Z-data 86 and DST-data 85 in accordance with a specific embodiment of the present invention. Portions of the DST-data 85 are stored in each of channels 0 and 1. Respectively, Portions of the Z-data 86 are stored in each of channels 0 and 1. A frame 80 of data is represented as being stored the Z-data 85 and DST-data locations respectively. The frame 80 may actually represent a partial frame.

As illustrated in FIG. 6, a shape 81 has a Z-data representation 81B of the shape 81 stored in channel 0, while a DST-data representation 81A of the shape is stored in channel 1. By storing data in this manner, it is assured that both the Z-data and the DST-data associated with the shape 80 can be accessed simultaneously. Note that shape 81 can actually be stored in both channels 0 and 1, as long as the Z-data and DST-data of the individual pixels of shape 81 are stored in different channels. For example, if Z-data representation 82A of the pixel 82 is in channel 1, and the DST-data representation 82B of the pixel 82 is in channel 0, advantages of the present invention can be realized.

Figure 7:
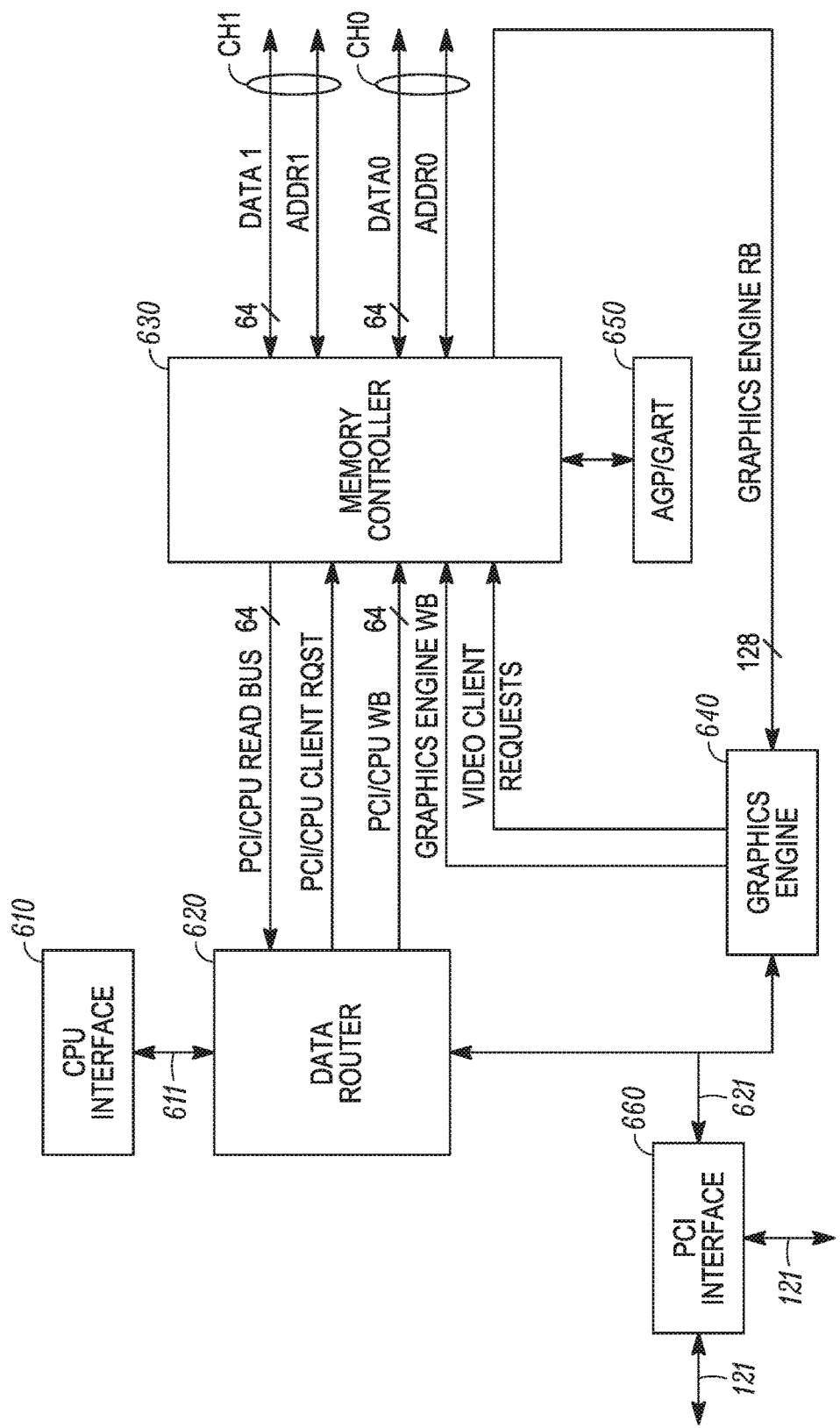
FIG. 7 illustrates, in block diagram form, a detailed view of the system/graphic controller of FIG. 1.

FIG. 7 illustrates a more detailed view of the system/graphics controller 120 of FIG. 1. System/graphics controller 120 includes a CPU interface portion 610, which is connected to the CPU 110 through bus 111, the CPU interface portion 610 is bi-directionally connected to the data router 620. The data router 620 is bi-directionally connected to the PCI interface 660 and the graphics engine 640 through bus 621.

PCI interface controller 660 interfaces to the PCI busses, 121 and 124, which are also illustrated in FIG. 1. In addition, the data router 620 accesses memory using a number of busses, including a bus labeled PCI/CPU READ BUS, a bus labeled PCI/CPU CLIENT REQUEST signal, and a bus labeled PCI/CPU WRITE BUS. In the embodiment illustrated the read and write bus are illustrated to be 64 bit busses, though other bus widths are capable of being used.

Memory controller 630 provides data to the bus labeled PCI/CPU READ BUS, and receives requests and data from the data router 620 over the busses labeled PCI/CPU CLIENT RQST bus and PCI/CPU WB respectively. In addition, the memory controller 630 is bi-directionally connected to the graphics engine 640 via the bus labeled GRAPHICS ENGINE WB. The memory controller 630 is connected to receive graphics client requests from the graphics engine 640 on the bus labeled GRAPHICS CLIENT REQUESTS. The memory controller 630 is bi-directionally connected to a GART, which translates addresses associated with graphics requests, and is discussed in greater detail herein.

The memory control 630 provides multiple address and data ports. Channel CH0 includes a first data bus labeled DATA0 and the first address bus labeled ADDR0. Channel CH1 includes a second data bus labeled DATA1 and a second address bus labeled ADDR1. In addition, both channel CH0 and CH1 provide control signals (not shown) associated with their respective data and address busses. The memory control 630 provides a 128-bit data bus labeled GRAPHICS ENGINE RB to the graphics engine 640.

In operation, the CPU interface 610 receives data requests and other system requests from the CPU 110 of FIG. 1. In one embodiment, the CPU 610 buffers the requests in order to receive requests from the CPU 110 at a different rate than data is received from the memory 140. In addition, it is desirable to provide appropriate buffer space within the CPU interface 610 to hold data being transmitted and received in order to avoid stalling the data router when information is being transmitted between the CPU 110 and the Memory 140. The CPU interface 610 asserts its requests on the bus 611.

The data router 620 receives requests on bus 611 from the CPU interface 610, and in response provides the requests to the data router 620. The data router 620 arbitrates requests from the CPU interface 610, the PCI interface 660, and the graphics engine 640. In one embodiment, the data router 620 has a "PCI like" bus 621, which is connected, to the PCI interface 660 and the graphics engine 640.

The term "PCI like" bus refers to a bus that performs substantially similar functions as a PCI bus. However, because the "PCI like" bus is entirely internal to the system/graphic controller 120, it is not necessary to maintain strict protocol compatibility because the bus does not need to interface to the external world. Therefore, to the extent modifications will simplify or improve performance of the bus 621, or if an entirely different proprietary bus is desired, such modifications can be implemented.

The data router 620 services data access requests from the CPU interface 610 and from devices connected to the bus 621 to the memory controller 630. In response to data requests, the data router provides data to the PCI/CPU write bus, and/or receives data from the PCI/CPU read bus. In the embodiment illustrated, the read and write buses are 64-bit buses.

The memory channels CH0 and CH1 each include a 64-bit data bus and an address bus connected to the respected banks of memory. Access to each of the channels CH0 and CH1 is controlled through the memory controller 630. The memory controller 630 also receives graphics client data requests from the graphics engine 640. If the graphics data address requested is not currently mapped to the graphics portion of the unified memory, a request is made to the GART (Graphics Address Relation Table) to translate the address. If a hit occurs, the translation is performed within the GART 650, and the translation information is provided to Memory Controller 630. When a miss occurs, and the translation is not within the GART, the GART makes a request to the memory controller 630 to access memory to determine the translation. This translation information is retrieved and returned to the GART, which updates its tables and provides the translation to the Memory Controller 630. Depending upon the implementation, the GART 650 may be part of the Memory Controller 630.

The GART has traditionally been part of an AGP port. However, now, because the GART is now contained within the same silicon as the memory control 630, it is no longer necessary to maintain a full AGP protocol between the memory control 630 and the GART portion 650. Therefore, a system specific protocol can be used in order to minimize the amount of overhead and/or maximize the performance associated with implementing these translation table requests through the GART 650.

The graphics engine 640 will provide graphics client requests to the memory controller 630, which in turn accesses memory channels CH0 and CH1 in order to provide the requested to the graphics engine 640. As illustrated in FIG. 7, the memory controller 630 provides 128-bit data to the graphics engine 640. 128 bits of data are provided to the graphics engine 640 by either accessing channels CH0 and CH1 simultaneously, or accessing channels of data separately, and buffering the data until the full 128-bit data word is available.

Figure 8:
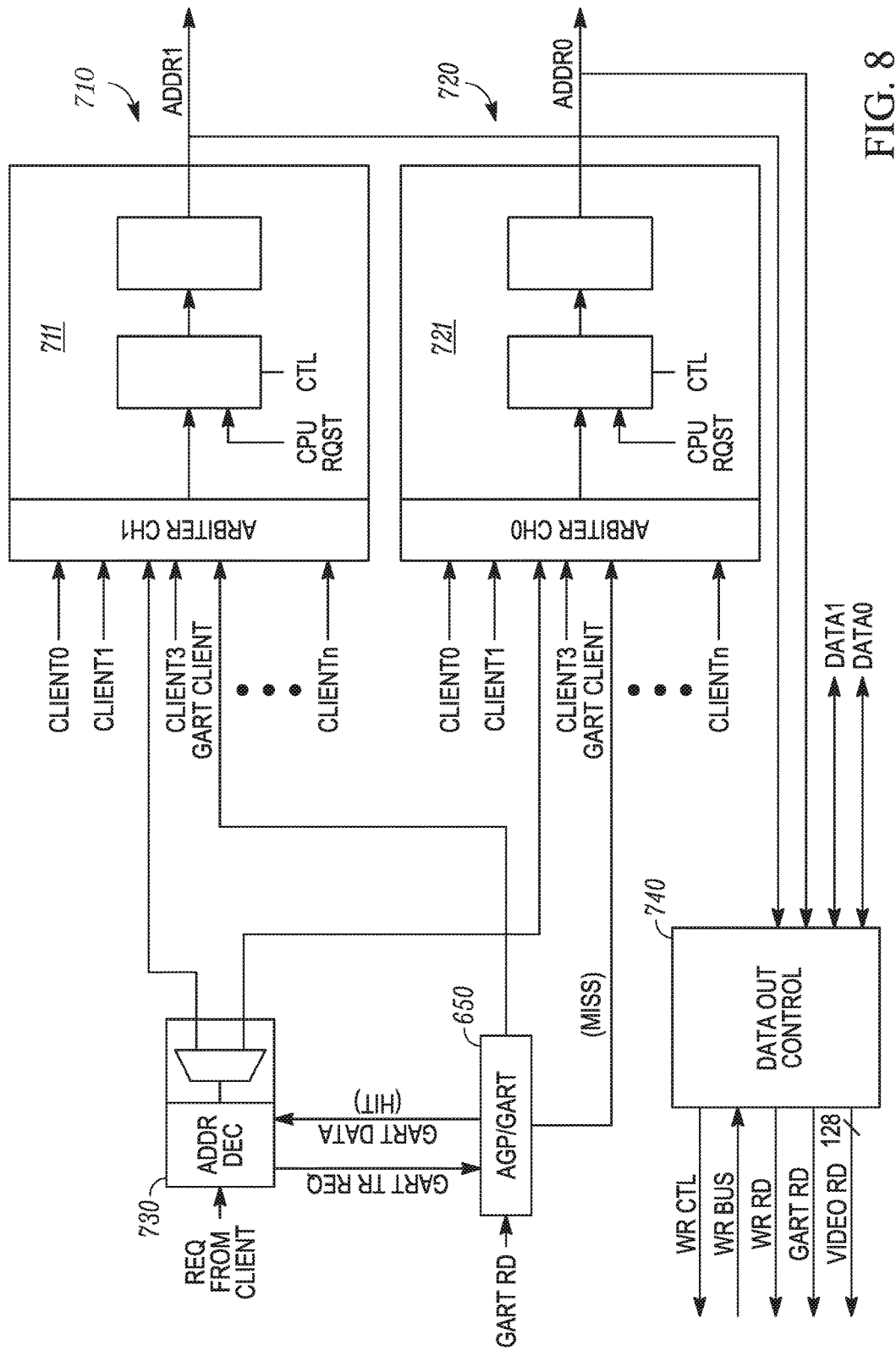
FIG. 8 illustrates, in block diagram form, a detailed view of the memory controller associated with FIG. 7.

FIG. 8 further illustrates an address decoder labeled ADDR DEC 730 for receiving a client request. Note that the client request can be from one of a plurality of clients. The translation of the address requested by the client will be dispatched to one of the arbiters of channel 0 or channel 1, unless the translation of the requested address is in the AGP space. When the address in is in the AGP space, the decoder 730 will issue a request to the AGP/GART 650 for a translation over the bus labeled GART TR REQ. In response, the AGP/GART will provide a translated address to the decoder 730 on the bus labeled GART DATA. Subsequently, the decoder 730 will dispatch the translated address received from the AGP/GART to one of the arbiters.

As illustrated in FIG. 8, a client to request can be provided to either of the channel 0 arbiter and the channel 1 arbiter based upon whether the information requested is located within its respective memory space. In operation, when the arbiter of one of the channels receives client requests, a decision will be made as to which client request to process.

In the specific embodiment illustrated, requests from the CPU 110 bypass the arbiters and are provided directly into the sequencer portions 711 and 721 of the channels. By bypassing the arbiter, CPU accesses can be made more quickly to assure that for CPU operations do not stall. In order to assure a client in urgent need of data is serviced, the circuit portions 710 and 720 receive an URGENT indicator. The indicator is capable of identifying a client needing data, and assures the CTL value selects the arbiter and not the CPU. In a specific implementation, the amount of time allocated to the CPU can be limited such that the CPU gets a proportional amount of time, such as 2:1. In this manner, the CPU can be prioritized without taking virtually all of the memory access bandwidth. Ultimately, all requests are provided to a sequencer portion 711 and 721 of the respective channels CH0 and CH1.

When an read request by controller portion 710 and/or 720 is satisfied, the data will be received by the data out block 740. The data out block 740 routes the received data to the requesting client. Note, the Data Out Block 710 may buffer the received data to be provide the indicated 128 bits.

FIG. 8 further illustrates an address decoder labeled ADDR DEC 730 for receiving a client request. Note that the client request can be from one of a plurality of clients. The a translation of the address requested by the client will be dispatched to one of the arbiters of channel 0 or channel 1, unless the translation of the requested address is in the AGP space. When the address in is in the AGP space, the decoder 730 will issue a request to the AGP/GART 650 for a translation over the bus labeled GART TR REQ. In response, the AGP/GART will provide a translated address to the decoder 730 on the bus labeled GART DATA. Subsequently, the decoder 730 will dispatch the translated address received from the AGP/GART to one of the arbiters.

Figure 9:
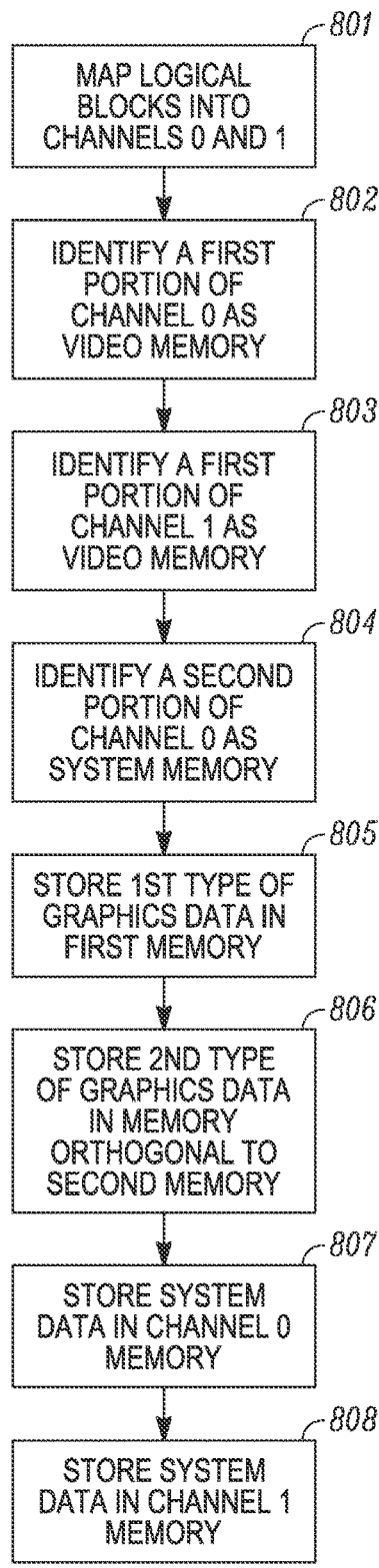
FIG. 9 illustrates in flow diagram form, a method associated with the present invention.

The method implemented by the forgoing description is illustrated in FIG. 9. At step 801 of FIG. 9 logical blocks of memory are mapped into channels 0 and 1. One specific embodiment for mapping logical blocks was discussed with reference to FIG. 5.

At step 802, a first portion of the memory of Channel 0 is identified as graphics memory. Likewise, at step 803, a first portion of the Channel 1 memory is identified as graphics memory. In a specific embodiment, the Channel 1 and 0 memory will overlap as illustrated in FIGS. 4A and 4B.

At step 804, a second portion of the memory of Channel 0 is identified as system memory in the manner illustrated in FIGS. 4A and 4B. In an optional step, a second portion of the memory of Channel 1 can also be identified as system memory.

At step 805, a memory controller, or other hardware or software mechanism, stores a first type of graphics data in memory. This is analogous to the Z DATA illustrated in FIG. 5 being written into BLOCKs 0-3. How many blocks to which the data is stored will be dependent upon the number of pixels being represented. At step 806, a different type of data, such as DST data, is stored orthogonal to the first type of graphics data in memory. In other words if for a first pixel, the first type of data is stored in channel 0 memory, the second type of data of data for the first pixel is stored in channel 1. As discussed herein, this allows the first and second type of data related to a first pixel to be accessed simultaneously.

At step 807, system data is stored into channel 0 memory. Likewise, system data could also be stored in channel 1 memory as indicated at step 808. The method of FIG. 9 can be used to access a unified memory in the manners described herein. As such, the advantages of the present invention are realized, including, being able to partition varying amounts of memory to graphics memory, accessing multiple data types simultaneously, prioritization of CPU accesses, and allowing for asynchronous accesses.

The present application has the advantage that a unified memory can be allocated between the system and the graphics without compromising performance. It should be apparent to one skilled in the art that other implementations that those disclosed herein can be used to meet the claimed invention.

What is claimed is:

1. A method, carried out by a memory controller, the method comprising: arbitrating access to at least a portion of unified memory among a plurality of client data access requests from a plurality of clients to a plurality of memory channels, wherein the plurality of memory channels are accessible bypassing arbitration of the plurality of client data access requests to said at least a portion of the unified memory in response to a CPU data access request to said at least same portion of the unified memory; and controlling the plurality of memory channels to access client data address space and CPU data address space of the same unified memory simultaneously.

2. The method of claim 1, further comprising:
providing higher priority access to a video/graphics engine data access request compared to the CPU data access request.

3. The method of claim 1, further comprising: communicating data with the CPU at a first rate; and communicating data with the same unified memory at a second rate, the second rate being substantially different from the first rate.

4. The method of claim 3, wherein the first rate is substantially higher than the second rate.

5. The method of claim 1, further comprising:
receiving the plurality of client data access requests from the plurality of clients;
translating the plurality of client data access requests to a plurality of requested data access addresses; and
arbitrating the plurality of requested data access addresses.

6. The method of claim 1, further comprising: receiving the arbitrated client data access requests simultaneously; and providing simultaneous data access to the same unified memory in response to the arbitrated client data access requests.

7. The method of claim 6, further comprising: receiving the arbitrated client data access requests simultaneously from a first processor and a second processor; and providing simultaneous data access to the same unified memory in response to the arbitrated client data access requests by providing data access to the first processor and providing data access to the second processor.

8. The method of claim 7, further comprising: receiving the CPU data access request from the first processor; receiving video/graphics engine data access request from the second processor simultaneously; providing simultaneous data access to the same unified memory in response to the arbitrated client data access requests by providing CPU data access to the first processor; and providing video/graphics engine data access to the second processor; wherein the first processor is a CPU and the second processor is a video/graphics engine.

9. The method of claim 1, wherein the plurality of memory channels each comprise an address bus portion, a control bus portion, and a data bus portion.

10. The method of claim 9, wherein the plurality of memory channels each comprise a plurality of read and write buses.

11. The method of claim 7, wherein the providing further comprises: providing simultaneous data access to the same unified memory in response to the arbitrated client data access requests by providing data access to the first processor over a first memory channel among the plurality of memory channels and providing data access to the second processor over a second memory channel among the plurality of memory channels.

12. A method, carried out by a system/graphic controller, the method comprising: communicating data between the system/graphic controller and unified memory at a first rate; communicating data between the system/graphic controller and the same unified memory at a second rate; communicating data between the system/graphic controller and a CPU at a third rate, wherein the third rate is substantially different from the first and second rates; communicating data between a video/graphics engine and the same unified memory through both a first memory channel and a second memory channel such that data from the video/graphics engine and the CPU is communicated through the first memory channel and data from both the video/graphics engine and the CPU is communicated through the second memory channel; and controlling each memory channel to access video/graphics engine data address space and CPU data address space in the same unified memory simultaneously.

13. The method of claim 12, wherein the third rate is substantially higher than the first and second rates.

* * * * *